(12) United States Patent
Kunieda et al.

(10) Patent No.: US 11,192,136 B2
(45) Date of Patent: Dec. 7, 2021

(54) METHOD OF FLATTENING POWDER SURFACE AND POWDER RESIN COATING DEVICE

(71) Applicant: HONDA MOTOR CO., LTD., Tokyo (JP)

(72) Inventors: Hiroshi Kunieda, Tochigi (JP); Kenji Miyanaga, Tochigi (JP); Junji Nakajima, Tochigi (JP); Hiroomi Shimizu, Tochigi (JP); Hirokazu Akiyoshi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 462 days.

(21) Appl. No.: 16/183,889

(22) Filed: Nov. 8, 2018

(65) Prior Publication Data

US 2019/0134662 A1 May 9, 2019

(30) Foreign Application Priority Data

Nov. 9, 2017 (JP) .............................. JP2017-216586

(51) Int. Cl.
*B05D 1/24* (2006.01)
*B05C 19/02* (2006.01)
(Continued)

(52) U.S. Cl.
CPC .................. *B05D 1/24* (2013.01); *B01J 8/24* (2013.01); *B05C 11/1007* (2013.01); *B05C 19/02* (2013.01)

(58) Field of Classification Search
None
See application file for complete search history.

(56) References Cited

U.S. PATENT DOCUMENTS

| 2003/0044524 A1 | 3/2003 | Hoffland |
| 2006/0134319 A1 | 6/2006 | Itatani et al. |
| 2017/0144374 A1* | 5/2017 | Ono .................. B29C 64/165 |

FOREIGN PATENT DOCUMENTS

| CN | 1802221 | 7/2006 |
| JP | S61-287470 A | 12/1986 |

(Continued)

OTHER PUBLICATIONS

U.S. Office Action, from corresponding U.S. Appl. No. 16/183,881 dated Jun. 18, 2020, 18 pages.
(Continued)

*Primary Examiner* — Nadine G Norton
*Assistant Examiner* — Bradford M Gates
(74) *Attorney, Agent, or Firm* — Rankin, Hill & Clark LLP

(57) ABSTRACT

To provide a powder resin coating method and powder resin coating device which can maintain a powder surface as flat irrespective of changes in the average particle size of powder resin. A powder resin coating device (1) includes a powder fluidizing bed (2) storing powder resin, a vibration mechanism (5) connected to the powder fluidizing bed (2), and a control device (8) controlling the frequency of the vibration mechanism (5). The control device (8) includes an average particle size estimation unit (82) that estimates the average particle size of powder resin stored within the powder fluidizing bed (2); an optimum frequency determination unit (83) that determines an optimum frequency for causing the powder surface to flatten based on the average particle size estimated by the average particle size estimation unit (82); and a frequency control unit (84) causing the vibration mechanism (5) to vibrate at the determined optimum frequency.

2 Claims, 12 Drawing Sheets

(51) Int. Cl.
*B01J 8/24* (2006.01)
*B05C 11/10* (2006.01)

(56) References Cited

FOREIGN PATENT DOCUMENTS

| | | |
|---|---|---|
| JP | H10-287827 A | 10/1998 |
| JP | 2003-290691 A | 10/2003 |
| JP | 2011-139992 | 7/2011 |
| JP | 2011-234240 | 11/2011 |
| JP | 2011-235240 | 11/2011 |

OTHER PUBLICATIONS

Japanese Office Action, Application No. 2017-216589 dated Jun. 4, 2019, 3 pages.
Chinese Office Action, Application No. 201811324710.4, dated Jul. 1, 2020, 8 pages.

\* cited by examiner

FIG. 10

| MAGNITUDE OF VARIATION IN POWDER SURFACE HEIGHT | | AVERAGE PARTICLE SIZE[μm] | | |
|---|---|---|---|---|
| | | a1 | a2 | ... |
| FREQUENCY[Hz] | f1 | σ11 | σ21 | ... |
| | f2 | σ12 | σ22 | ... |
| | ... | ... | ... | ... |

FIG. 11

| | | OPTIMUM FREQUENCY[Hz] |
|---|---|---|
| ESTIMATED AVERAGE PARTICLE SIZE[μm] | a1 | f1 |
| | a2 | f2 |
| | ... | ... |

METHOD OF FLATTENING POWDER SURFACE AND POWDER RESIN COATING DEVICE

This application is based on and claims the benefit of priority from Japanese Patent Application No. 2017-216586, filed on 9 Nov. 2017, the content of which is incorporated herein by reference.

BACKGROUND OF THE INVENTION

Field of the Invention

The present invention relates to a method of flattening a powder surface, and a powder resin coating device. In more detail, it relates to a method of flattening a powder surface and a powder resin coating device which cause the surface of powder resin in a tank used upon forming a coating film on a workpiece to flatten based on a fluidized bed coating process.

Related Art

Fluidized bed coating process is one of the coating techniques for forming a coating film on a workpiece. In more detail, the fluidized bed coating process immerses a workpiece which has been heated in advance into a powder fluidizing bed in which the powder resin is flowing, and causes the powder resin to deposit on the surface of the workpiece by way of the heat thereof, thereby forming a coating film.

In this way, with fluidized bed coating process, if slants or surface irregularities exist in the surface of the powder resin (hereinafter referred to simply as "powder surface") stored within the powder fluidizing bed due to the coating film being formed at a portion immersing the workpiece in the powder resin, a portion at which the coating film is not sufficiently formed will occur, and the quality of the final product may decline. Therefore, in recent years, the slants and surface irregularities in the powder surface are decreased by causing this powder fluidizing bed to vibrate using a vibration device, while supplying air inside the powder fluidizing bed using a flow means (for example, refer to Japanese Unexamined Patent Application, Publication No. 2011-139992). In addition, with the powder resin coating device of Japanese Unexamined Patent Application, Publication No. 2011-139992, assuming that the surface irregularities in the powder surface occur due to bubbles formed by a flow means in the powder fluidizing bed breaking, the vibration amount of the vibration device (period, direction, displacement, etc.) are set according to the size, quantity, etc. of bubbles generated within the powder fluidizing bed so that the surface irregularities in the powder surface disappear.

SUMMARY OF THE INVENTION

However, when causing the powder fluidizing bed to vibrate by the vibration device, despite being slight, the relatively light small-diameter powder resin among the powder resin stored in the bed swirl out of the bed. For this reason, if continuing to repeatedly use the powder resin coating device, the average particle size of powder resin stored within the powder fluidizing bed is considered to gradually increase.

In addition, the optimum frequency of the vibration device such that makes the powder surface flat is considered to vary not only by the size, quantity, etc. of bubbles such as those shown in Japanese Unexamined Patent Application, Publication No. 2011-139992, but also the average particle size of powder resin within the bed. However, conventionally, since changes in average particle size of the powder resin within the bed is not taken into account, when using over an extended period, surface irregularities in the powder gradually increase as shown in FIGS. 13 and 14, and consequently, the quality of the final product may gradually decline. In addition, in order to set the average particle size of powder resin within the bed to a known size, although the powder resin within the bed may be completely replaced with one having a known average particle size, when doing this, the cost may increase.

The present invention has an object of providing a method of flattening a powder surface and a powder resin coating device which can maintain a powder surface as flat, irrespective of changes in the average particle size of the powder resin.

A method of flattening a powder surface according to a first aspect of the present invention in a powder resin coating device (for example, the powder resin coating device 1 described later) which includes a bed (for example, the powder fluidizing bed 2 described later) that stores powder resin and a vibration mechanism (for example, the vibration mechanism 5 described later) that is connected to the bed, causing a powder surface in the bed to flatten by controlling a frequency of the vibration mechanism, the method including the steps of: determining a frequency for causing a powder surface to flatten based on an average particle size of powder resin; and causing the vibration mechanism to vibrate at the frequency determined in the step of determining.

A method of flattening a powder surface according to a second aspect of the present invention in a powder resin coating device (for example, the powder resin coating device 1 described later) which includes a bed (for example, the powder fluidizing bed 2 described later) that stores powder resin and a vibration mechanism (for example, the vibration mechanism 5 described later) that is connected to the bed, causing a powder surface in the bed to flatten by controlling a frequency of the vibration mechanism, the method including the steps of: measuring a powder surface height within the bed after vibrating the vibration mechanism at a predetermined initial frequency; determining a frequency for causing a powder surface to flatten based on the powder surface height measured in the step of measuring; and causing the vibration mechanism to vibrate at the frequency determined in the step of determining.

A powder resin coating device (for example, the powder resin coating device 1 described later) according to a third aspect of the present invention includes: a bed (for example, the powder fluidizing bed 2 described later) which stores powder resin; a vibration mechanism (for example, the vibration mechanism 5 described later) connected to the bed; and a control device (for example, the control device 8 described later) which controls a frequency of the vibration mechanism, in which the control device includes: a determination unit (for example, the average particle size estimation unit 82 and optimum frequency determination unit 83 described later) for determining a frequency for causing a powder surface to flatten based on an average particle size of powder resin stored within the bed; and a frequency control unit (for example, the frequency control unit 84 described later) for causing the vibration mechanism to vibrate at the frequency determined by the determination unit.

A powder resin coating device (for example, the powder resin coating device 1 described later) according to a fourth aspect of the present invention includes: a bed (for example, the powder fluidizing bed 2 described later) which stores powder resin; a vibration mechanism (for example, the vibration mechanism 5 described later) connected to the bed; a measurement device (for example, the level meter 7 described later) which measures a powder surface height within the bed; and a control device (for example, the control device 8 described later) which controls a frequency of the vibration mechanism, in which a determination unit (for example, the average particle size estimation unit 82 and optimum frequency determination unit 83 described later) for determining a frequency for causing a powder surface to flatten based on the powder surface height measured by the measurement device; and a frequency control unit (for example, the frequency control unit 84 described later) for causing the vibration mechanism to vibrate at the frequency determined by the determination unit.

The first aspect of the present invention determines the frequency for causing the powder surface to flatten based on the average particle size of the powder resin stored within the bed (determination step), and further causes the vibration mechanism to vibrate at this determined frequency (frequency control step). According to the method of flattening a powder surface of the present invention, since it is possible to cause the vibration mechanism to vibrate at the appropriate frequency according to the variation in average particle size of powder resin within the bed, it is possible to maintain the powder surface flat over a long period, and possible to maintain the quality of the finished product to be high. In addition, according to the method of flattening a powder surface of the present invention, since it is possible to also reduce the frequency of occurrence of completely replacing the powder resin within the bed, the cost can be decreased by this amount.

The second aspect of the present invention determines the frequency for causing the powder surface to flatten based on the powder surface height of the powder resin stored in the bed (determination step), and further causes the vibration mechanism to vibrate at this determined frequency (frequency control step). According to the method of flattening a powder surface of the present invention, since it is possible to cause the vibration mechanism to vibrate at the appropriate frequency according to the variation in powder surface height of powder resin within the bed, it is possible to maintain the powder surface flat over a long period, and possible to maintain the quality of the finished product to be high. In addition, according to the method of flattening a powder surface of the present invention, since it is possible to also reduce the frequency of occurrence of completely replacing the powder resin within the bed, the cost can be decreased by this amount.

The powder resin coating device according to the third aspect of the present invention determines the frequency for causing the powder surface to flatten based on the average particle size of the powder resin, and further causes the vibration mechanism to vibrate at this determined frequency. According to this powder resin coating device of the present invention, since it is possible to cause the vibration mechanism to vibrate at the appropriate frequency according to the variation in average particle size of powder resin within the bed, it is possible to maintain the powder surface flat over a long period, and possible to maintain the quality of the finished product to be high. In addition, according to the powder resin coating device of the present invention, since it is possible to also reduce the frequency of occurrence of completely replacing the powder resin within the bed, the cost can be decreased by this amount.

The powder resin coating device according to the fourth aspect of the present invention determines the frequency for causing the powder surface to flatten based on the powder surface height of the powder resin, and further causes the vibration mechanism to vibrate at this determined frequency. According to this powder resin coating device of the present invention, since it is possible to cause the vibration mechanism to vibrate at the appropriate frequency according to the variation in powder surface height of powder resin within the bed, it is possible to maintain the powder surface flat over a long period, and possible to maintain the quality of the finished product to be high. In addition, according to the powder resin coating device of the present invention, since it is possible to also reduce the frequency of occurrence of completely replacing the powder resin within the bed, the cost can be decreased by this amount.

BRIEF DESCRIPTION OF THE DRAWINGS

FIG. 10 is an example of a powder surface height—average particle size table;

FIG. 11 is an example of an average particle size—optimum frequency table;

DETAILED DESCRIPTION OF THE INVENTION

Figure 1:
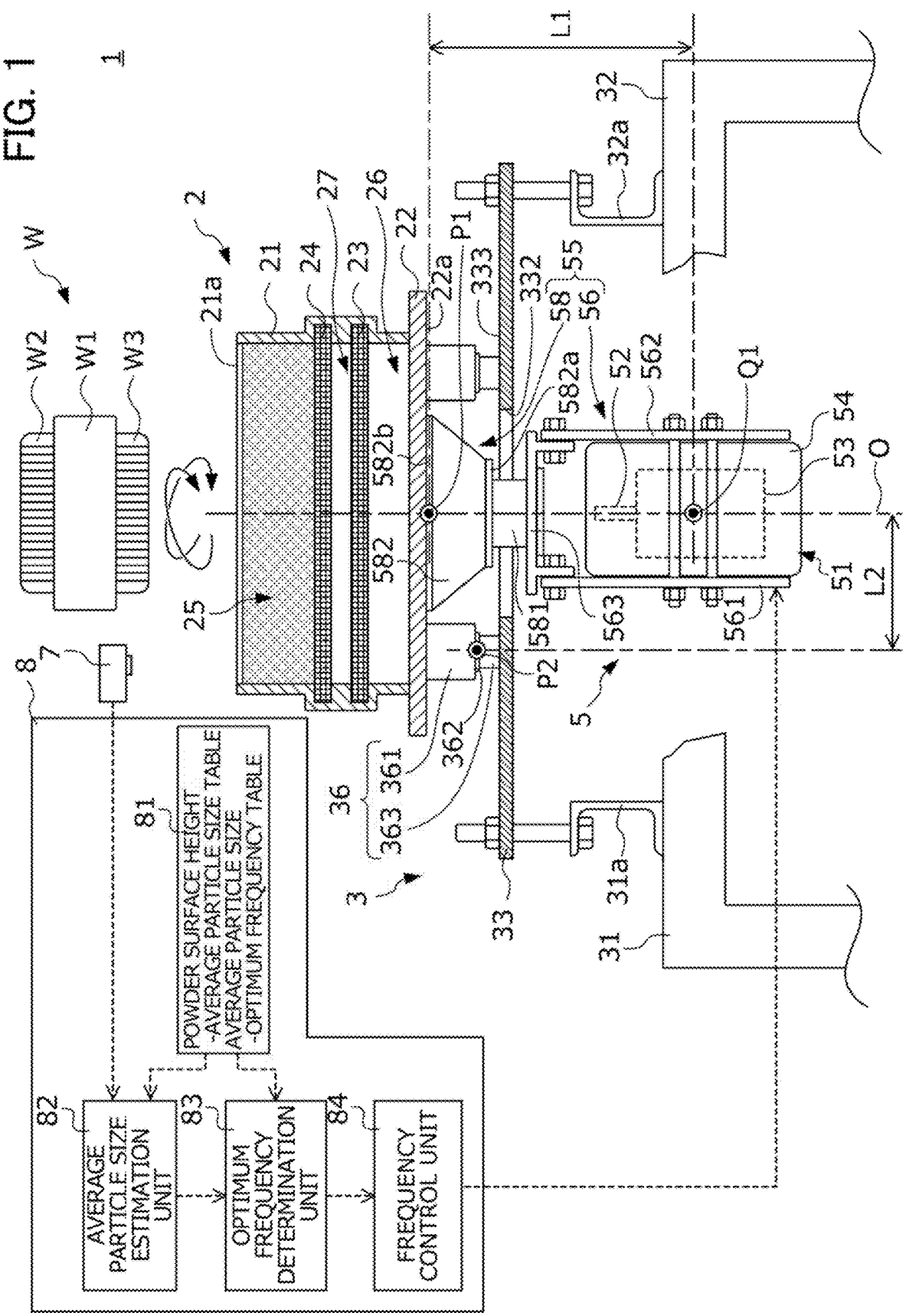
FIG. 1 is a partial cross-sectional view showing the configuration of a powder resin coating device to which a powder resin coating method according to an embodiment of the present invention is applied.

Hereinafter, an embodiment of the present invention will be explained while referencing the drawings. FIG. 1 is a partial cross-sectional view showing the configuration of a powder resin coating device 1 to which a method of flattening a powder surface according to the present embodiment is applied. The powder resin coating device 1 is used in order to form a coating film on a workpiece W based on a fluidized bed coating process, and includes: a powder fluidizing bed 2 that stores powder resin, a stand 3 that supports this powder fluidizing bed 2 on a placement surface (not illustrated), a vibration mechanism 5 connected to the bottom surface 22a of the powder fluidizing bed 2, a level meter 7 that detects a powder surface height in the powder fluidizing bed 2, and a control device 8 that controls the vibration mechanism 5.

It should be noted that a case of defining a stator which is a component of a generator equipped to a vehicle as the workpiece W will be explained hereinafter; however, the present invention is not limited thereto. The workpiece W that is the stator is configured by combining a cylindrical stator core W1, and a stator coil W2 provided in a plurality of slots formed inside of this stator core W. In addition, in the workpiece W, an end of the stator coil W2 downwards in the vertical direction serves as a coating site W3. Hereinafter, a case of using the powder resin coating device 1 to form a coating film of resin on a coating site W3, and conducting insulation coating on this coating site W3 will be explained.

Figure 2:
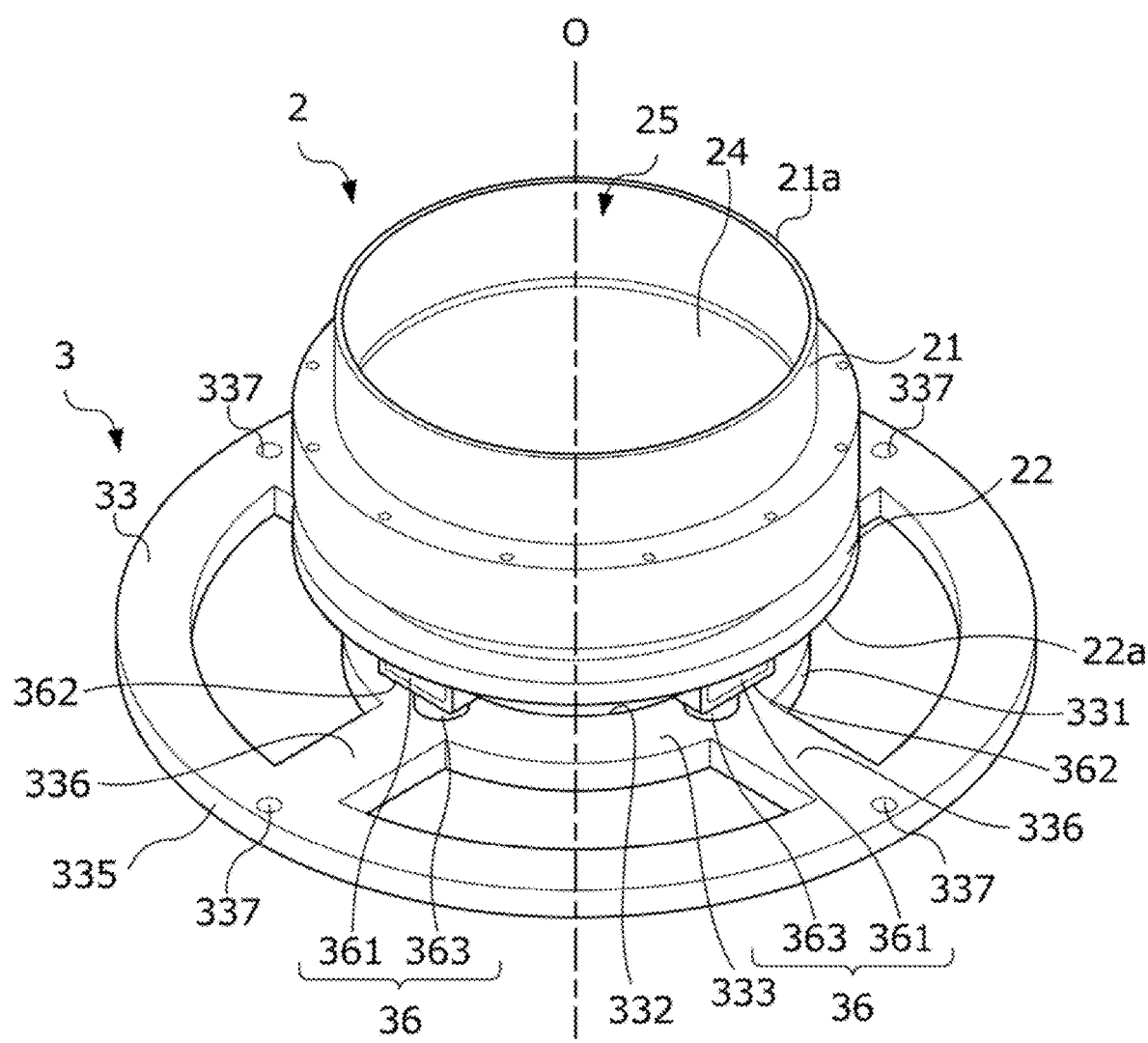
FIG. 2 is a perspective view showing the configuration of a powder fluidizing bed and part of a stand.

FIG. 2 is a perspective view showing the configuration of a powder fluidizing bed 2 and part of a stand 3. The powder fluidizing bed 2 is substantially circular in a plan view. The powder fluidizing bed 2 includes: a cylindrical trunk 21 which extends along a vertical direction, a disc-like base plate 22 provided to the bottom of this trunk 21, and the two of a disc-like first partition plate 23 and second partition plate 24 provided inside of the trunk 21. A porous plate in which countless holes smaller than the particle size of the pulverized powder resin are formed can be used, respectively, in these first and second partition plates 23, 24.

In the powder fluidizing bed 2, a powder storage unit 25 in which pulverized powder resin is stored is formed by the space from this second partition plate 24 until the edge 21a of the trunk 21 with the second partition plate 24 as a base plate. In addition, in the powder fluidizing bed 2, a first air chamber 26 is formed by the space demarcated by the base plate 22 and first partition plate 23, and a second air chamber 27 is formed by the space demarcated by the first partition plate 23 and second partition plate 24. In addition, within the first air chamber 26, the air from an air supply device (not illustrated) is provided. The air supplied into the first air chamber 26 influxes into the second air chamber 27 via the first partition plate 23 which is a porous body, further influxes into the powder storage unit 25 via the second partition plate 24 which is a porous body, and causes the powder resin stored inside this powder storage unit 25 to flow. In addition, when the powder resin stored inside the powder storage unit 25 decreases due to use, new powder resin is supplied as appropriate via a hopper (not illustrated) into this powder storage unit 25.

It should be noted that, hereinafter, the length along the axis line O from the bottom surface 22a of the powder fluidizing bed 2 until the edge part 21a, i.e. height of the powder fluidizing bed 2, is denoted as "H". In addition, the radius of the powder fluidizing bed 2 is denoted as "r". In addition, the preferred settings of this height H and radius r of the powder fluidizing bed 2 will be described in detail later.

The stand 3 includes: a plurality of columnar fixed frames 31, 32 extending along the vertical direction, a sheet-like fixed plate 33 extending along the horizontal direction, and a plurality of support members 36 which support the powder fluidizing bed 2 on the fixed plate 33.

The ends on the lower side in the vertical direction of the fixed frames 31, 32 are respectively fixed to installation surfaces, which are not illustrated.

The fixed plate 33 is substantially disk shaped in a plan view, and is provided coaxially with the axis line O of the powder fluidizing bed 2. The fixed plate 33 includes: an annular small-diameter plate 331 having a diameter substantially equal to the powder fluidizing bed 2, a large-diameter plate 335 having a diameter larger than the small-diameter plate 331, and a connection plate 336 which extends along the radial direction to connect this small-diameter plate 331 and large-diameter plate 335. A through hole 332 for inserting the vibration mechanism 5 is formed in the small-diameter plate 331. In addition, a plurality of bolt holes 337 is formed in the large-diameter plate 335.

The fixed plate 33 is fixed to the fixed frames 31, 32 by fastening the upper ends 31a, 32a on the upper side in the vertical direction of the fixed frames 31, 32 and the large-diameter plate 335 with a plurality of bolts 338, so that a fixing surface which is a surface of the small-diameter plate 331 on the side of the powder fluidizing tank 2 becomes horizontal.

The support member 36 extends along the vertical direction, and elastically supports this powder fluidizing bed 2 to the fixing surface 333 by connecting the powder fluidizing bed 2 and the fixing surface 333 of the small-diameter plate 331 via an elastic member The support member 36 includes a leg portion 361 fixed to the bottom surface 22a of the powder fluidizing bed 2, and an elastic member 363 which is interposed between a lower end face 362 of the leg portion 361 and the fixing surface 333 of the small-diameter plate 331. For example, rubber is used in the elastic member 363. The support member 36 is provided at the bottom surface 22a of the powder fluidizing bed 2 more to the side of the axis line O than an edge part 21a, as shown in FIGS. 1, 2, etc. In this way, the powder fluidizing bed 2 is connected via the elastic member 363 to the fixing surface 333; therefore, when causing the powder fluidizing bed 2 to vibrate by way of the vibration mechanism 5 described later, it becomes possible to shake the powder fluidizing bed 2 so as to slope relative to the fixing surface 333. It should be noted that, hereinafter, a portion at which the leg portion 351 fixed to the bottom surface 22a of the powder fluidizing bed 2 and the elastic member 363 contact is referred to as a second connection part P2. In addition, the distance along the horizontal direction from the axis line O of the powder fluidizing bed 2 until this second connection part P2 is denoted as "L2". It should be noted that, as shown in FIG. 1 and FIG. 2, the support member 36 is provided in plurality (four in the example of the present application) at equal intervals along the circumferential direction on the bottom surface 22a of the powder fluidizing bed 2.

The vibration mechanism 5 includes a vibration unit 51 serving as a columnar oscillating body, and a connection mechanism 55 that connects the vibration unit 51 and the bottom surface 22a of the powder fluidizing bed 2.

The vibration unit 51 includes a vibration motor 53 having a rotation shaft 52, and a housing 54 which houses this vibration motor 53. The vibration motor 53 causes the rotation shaft 52 to rotate at a frequency according to the control signal from the control device 8. This rotation shaft 52 is connected to the bottom surface 22a of the powder fluidizing bed 2 via the connection mechanism 55 so as to become substantially coaxial with the axis line O of the powder fluidizing tank 2. In addition, an eccentric weight (not illustrated) is attached to this rotation shaft 52. Therefore, when causing the eccentric rotation shaft 52 to rotate by way of the vibration motor 53, the housing 54 vibrates. More specifically, the housing 54 vibrates so that the center point Q1 thereof makes a circular motion centered about the axis line O, within the horizontal plane perpendicular to the axis line O.

The connection mechanism 55 includes a bracket 56 which retains the housing 54, and a connection shaft member 58 which extends substantially coaxially with the axis line O and connects the bracket 56 and the bottom surface 22a of the powder fluidizing bed 2.

The bracket 56 includes a sheet-like first support plate 561 and second support plate 562 extending in parallel with each other and in parallel to the axis line O, and a third support plate 563 which is sheet-like extending along the horizontal direction, and connecting ends of these support plates 561, 562 on an upper side in the vertical direction. The first support plate 561 and second support plate 562 each are respectively connected to a pair of opposing sides of the housing 54. In addition, the distances along the horizontal direction from the rotation shaft 52 to the first support plate 561 and second support plate 562 are equal. In other words, the housing 54 is sandwiched equally by the two support plates 561, 562 centered about the rotation shaft 52. In addition, as shown in FIG. 1, the housing 54 is retained by the bracket 56, so as to be positioned more to the lower side in the vertical direction than the fixed plate 33.

The connection shaft member 58 includes a shaft part 581 which extends substantially coaxially with the axis line O and a connection part 582, and connects the bracket 56 provided more to the lower side in the vertical direction than the fixed plate 33 and the bottom surface 22a of the powder fluidizing bed 2 provided more to the upper side in the vertical direction than the fixed plate 33. The connection part 582 is a truncated cone shape, and expands in diameter as approaching towards a circular bottom 582b on the bottom surface 22a side of the powder fluidizing bed 2 from a circular top surface 582a on the bracket 56 side. The lower end side in the vertical direction of the shaft part 581 is fixed to the third support plate 563 of the bracket 56, and the upper end side in the vertical direction is fixed to the circular top surface 582a of the connection part 582. In addition, the circular bottom 582b of the connection part 582 is fixed to the bottom surface 22a of the powder fluidizing bed 2. It should be noted that, hereinafter, the center of the circular bottom 582b of the connection part 582 contacting the bottom 22a of the powder fluidizing bed 2 is referred to as first connection part P1. In addition, the distance along the axis line O from the center point Q1 of the housing 54 until the first connection part P1 thereof is denoted as "L1".

In addition, in the connection shaft member 58, the outside diameter of the circular bottom 582b of the connection part 582 that is the largest diameter is smaller than the inside diameter of the through hole 332 formed at the center of the fixed plate 33. For this reason, even in a case of the housing 54 vibrating in the above-mentioned way, the connection shaft member 58 is made so as not to contact with the fixed plate 33. Therefore, the vibrations occurring in the housing 54 transmit to the powder fluidizing bed 2 via the bracket 56 and connection shaft member 58 without being dampened by the fixed plate 33.

Next, the vibration mode of the powder resin realized inside the powder fluidizing bed 2 of the powder resin coating device 1 will be explained by referencing FIGS. 3A to 3C.

Figure 3A:
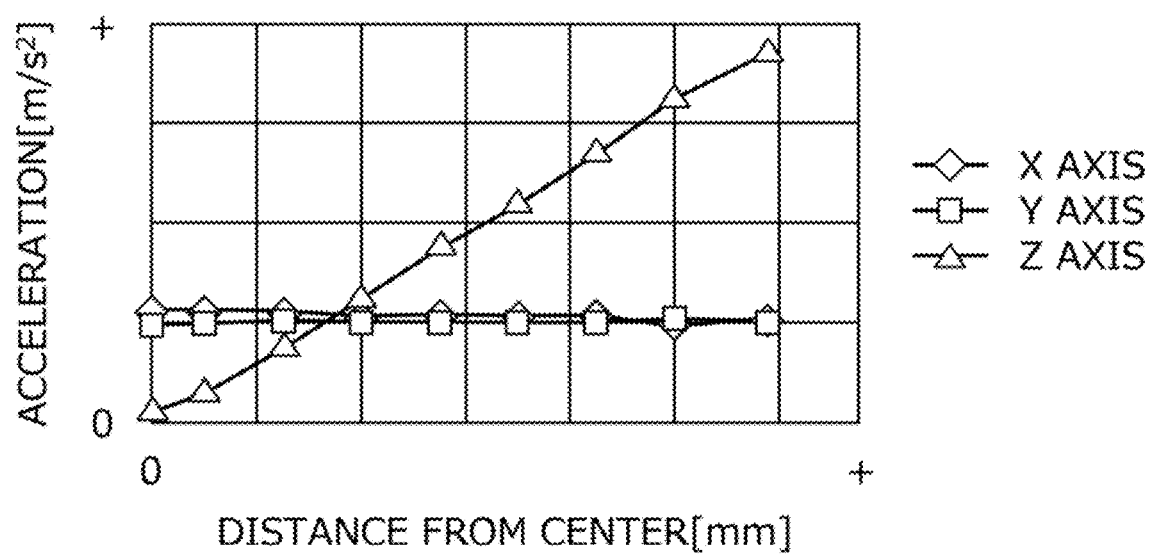
FIG. 3A is a graph showing measurement results of a distribution of acceleration applied to powder resin within the powder fluidizing bed.

FIG. 3A is a graph showing measurement results of a distribution of acceleration applied to powder resin within the powder fluidizing bed 2. FIG. 3B is a graph showing measurement results of a distribution of displacement of powder resin within the powder fluidizing bed 2. FIGS. 3A and 3B are results of the above-mentioned powder resin coating device 1 obtained in the case of elastically supporting the bottom surface 22a of the powder fluidizing bed 2 to the fixing surface 33 by the support member 36, and causing the powder fluidizing bed 2 to vibrate by transmitting the vibrations generated by the vibration unit 51 to the center of the bottom surface 22a of the powder fluidizing bed 2 via the connection mechanism 55. In addition, FIG. 3C is a graph viewing the powder fluidizing bed from above, and showing measurement positions of acceleration and displacement. As shown in FIG. 3C, nine of the measurement points of acceleration and displacement were set at equal intervals along the radial direction from the center until the edge part 21a in the powder fluidizing bed 2. In addition, the X axis and Y axis are axes parallel to the horizontal plane, and the Z axis is an axis parallel to the vertical direction.

Figure 3B:
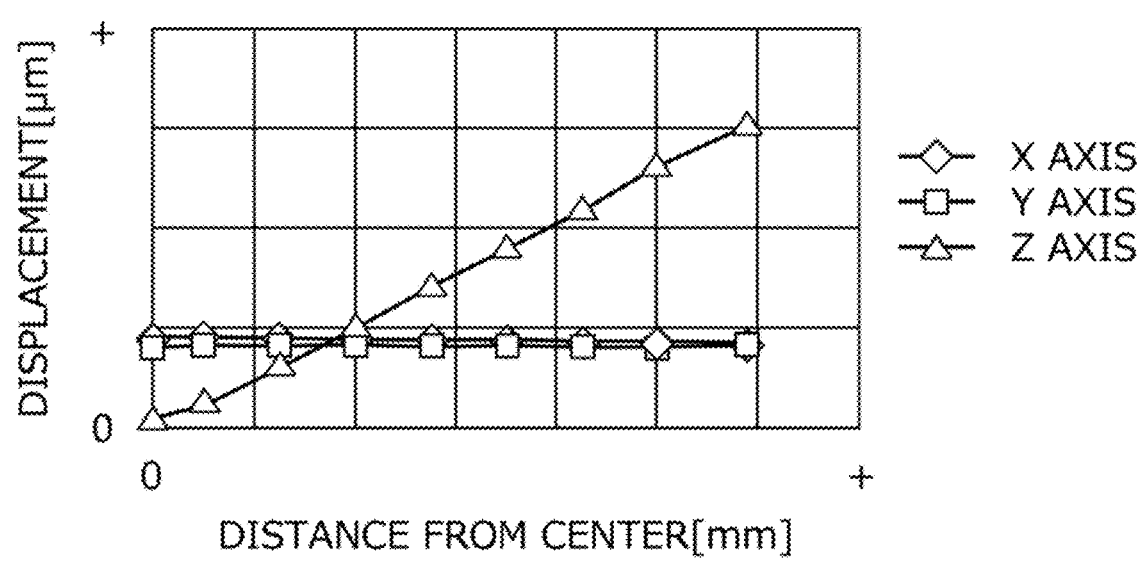
FIG. 3B is a graph showing measurement results of a distribution of displacement acting on powder resin within the powder fluidizing bed.
Figure 3C:
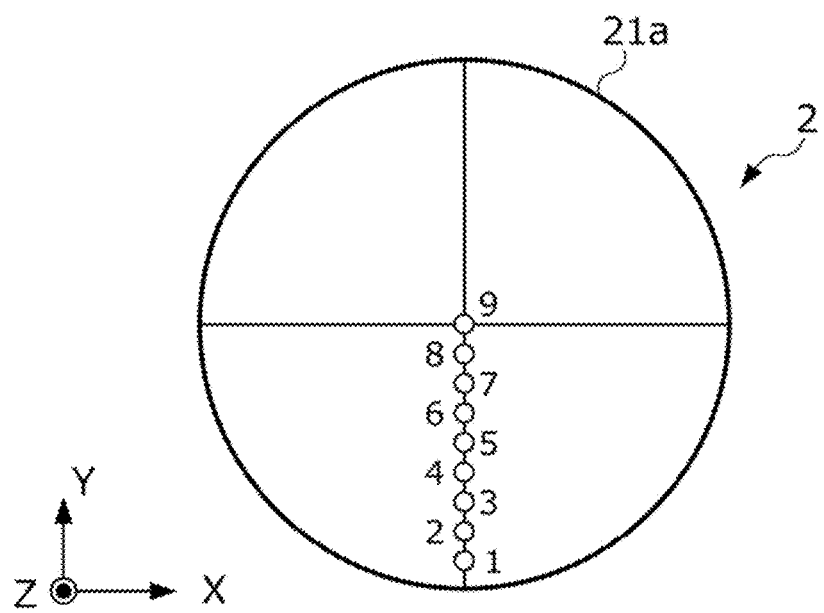
FIG. 3C is a graph viewing the powder fluidizing bed from above, and showing a measurement position of acceleration and displacement.

As shown in FIGS. 3A and 3B, the displacement and acceleration of vibration along the horizontal direction of the powder resin are both mostly constant irrespective of the distance from the center of the powder fluidizing bed 2. In contrast, the acceleration and displacement along the vertical direction of powder resin within the powder fluidizing bed 2 become larger as approaching towards the edge part 21a from the center of the powder fluidizing bed 2.

Next, convective flow of powder resin realized within the powder fluidizing bed 2 of the powder resin coating device 1 will be explained by referencing FIGS. 4A to 4C.

Figure 4A:
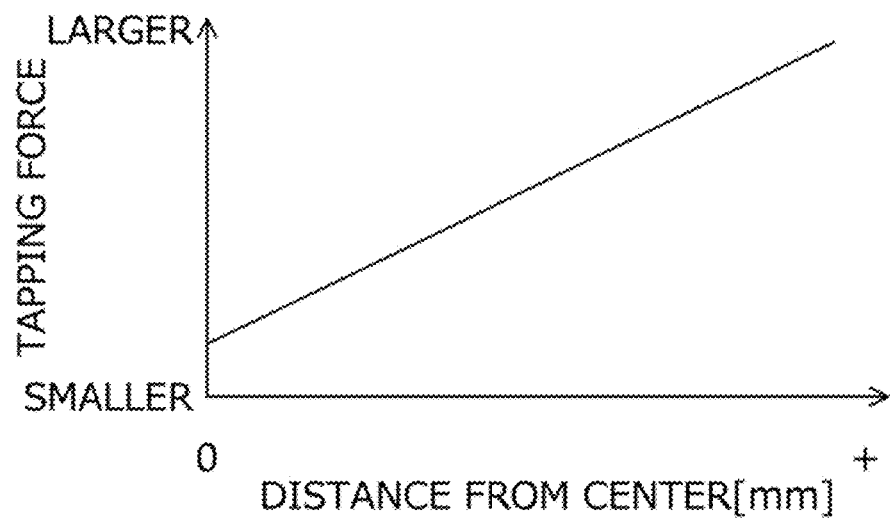
FIG. 4A is a graph showing the distribution of tapping force acting on the powder resin within the powder fluidizing bed.
Figure 4B:
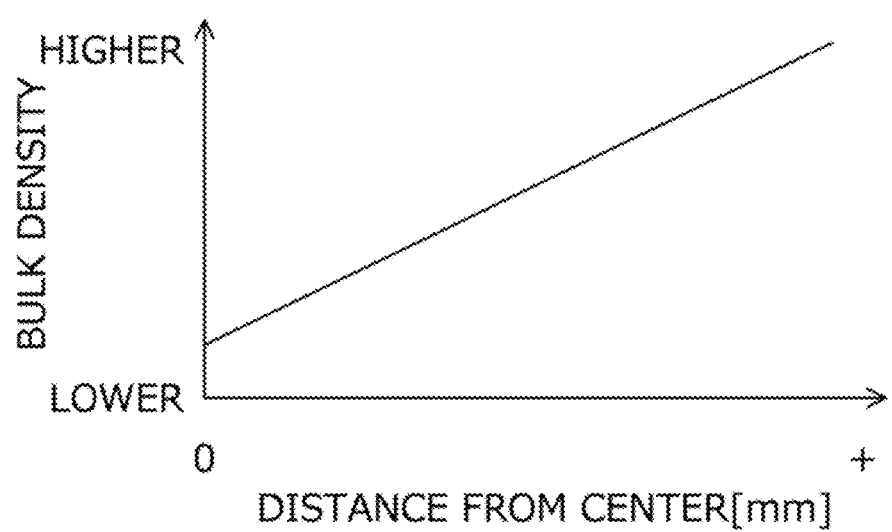
FIG. 4B is a graph showing the distribution of bulk density of powder resin within the powder fluidizing bed.

FIG. 4A is a graph schematically showing the distribution of tapping force acting on powder resin within the powder fluidizing bed 2; and FIG. 4B is a graph schematically showing the distribution of bulk density of powder resin within the powder fluidizing bed 2.

According to the powder resin coating device 1 of the present embodiment, the acceleration and displacement along the vertical direction of the powder resin within the powder fluidizing bed 2 can realize vibrations such that increase as approaching the edge part 21a from the center of the powder fluidizing bed 2. For this reason, the tapping force acting on the powder resin within the powder fluidizing bed 2 becomes larger as approaching the side of the edge part 21a from the center, as shown in FIG. 4A. In addition, the bulk density of powder resin within the powder fluidizing bed 2 thereby becomes higher as approaching the edge part 21a from the center of the powder fluidizing bed 2, as shown in FIG. 4B.

Figure 4C:
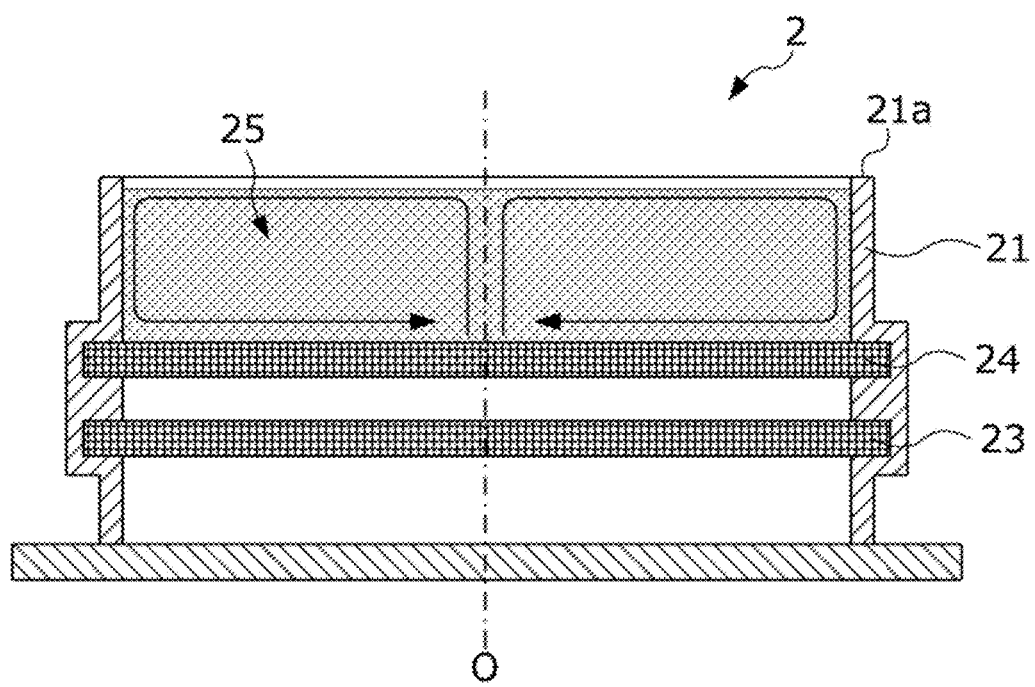
FIG. 4C is a view schematically showing convective flow formed within the powder fluidizing bed.

FIG. 4C is a view schematically showing convective flow formed within the powder fluidizing bed 2. As mentioned above, the bulk density of powder resin within the powder fluidizing bed 2 becomes lowest at the center of the powder fluidizing bed 2. For this reason, the air tends to pass through the most at the center of the powder fluidizing bed 2. For this reason, inside the powder storage unit 25 of the powder fluidizing bed 2, when supplying air from the second partition plate 24, which is the bottom surface thereof, convective flow of powder resin flowing radially from the center to the side of the edge part 21*a* is generated at the powder surface side within the powder fluidizing bed 2, as shown by the arrows in FIG. 4C. By way of this convective flow, a flat powder surface is formed within the powder fluidizing bed 2.

Next, the preferred setting ranges of the distances L1, L2 in the above such powder resin coating device 1, and height H and radius r of the powder fluidizing bed 2 will be explained.

Figure 5:
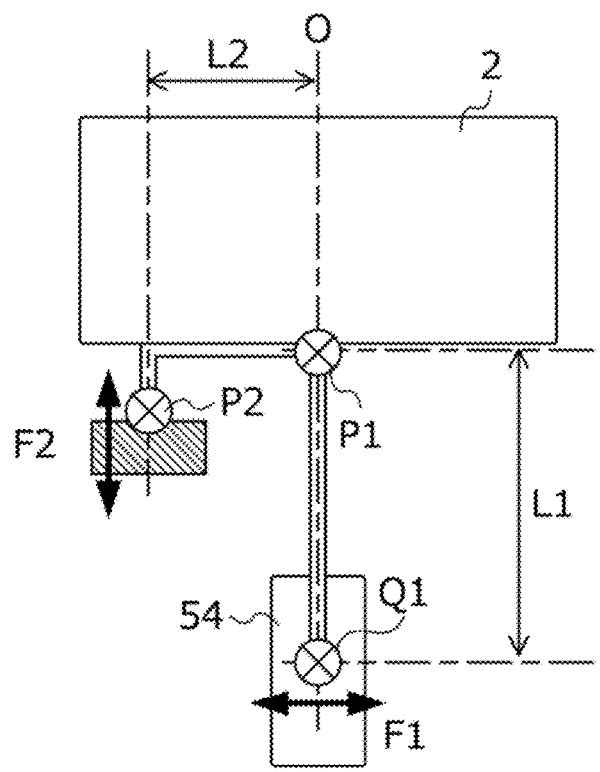
FIG. 5 is a view for explaining forces acting on the powder fluidizing bed during vibration of a housing.

FIG. 5 is a view for explaining forces acting on the powder fluidizing bed 2 during vibration of the housing 54. As shown in FIG. 5, when defining the center point Q1 as the point of force application, defining the first connection part P1 as a fulcrum, and defining the second connection part P2 as a working point, if a force F1 along the horizontal direction is applied to the center point Q1, a force F2 along the vertical direction will act on the powder fluidizing bed 2. At this time, the force F2 causing the powder fluidizing bed 2 to vibrate along the vertical direction, when using the distance L1 from the point of force application until the fulcrum and the distance L2 from the fulcrum until the working point, can be expressed as F2=(L1/L2)×F1. In other words, it is possible to make the powder fluidizing bed 2 to vibrate more strongly along the vertical direction as lengthening the distance L1 and shortening the distance L2.

In addition, in order to flatten the powder surface within the powder fluidizing bed 2, it is effective to make the vibration acceleration along the vertical direction of the powder fluidizing tank 2 greater than the vibration acceleration along the horizontal direction. Therefore, the present embodiment makes the distance L1 along the axis line O from the center point Q1 of the housing 54 until the first connection part P1 longer than the distance L2 along the horizontal direction from the axis line O until the second connection part P2, so that it is possible to make the vibration acceleration along the vertical direction of the powder fluidizing tank 2 larger than the vibration acceleration along the horizontal direction.

Figure 6:
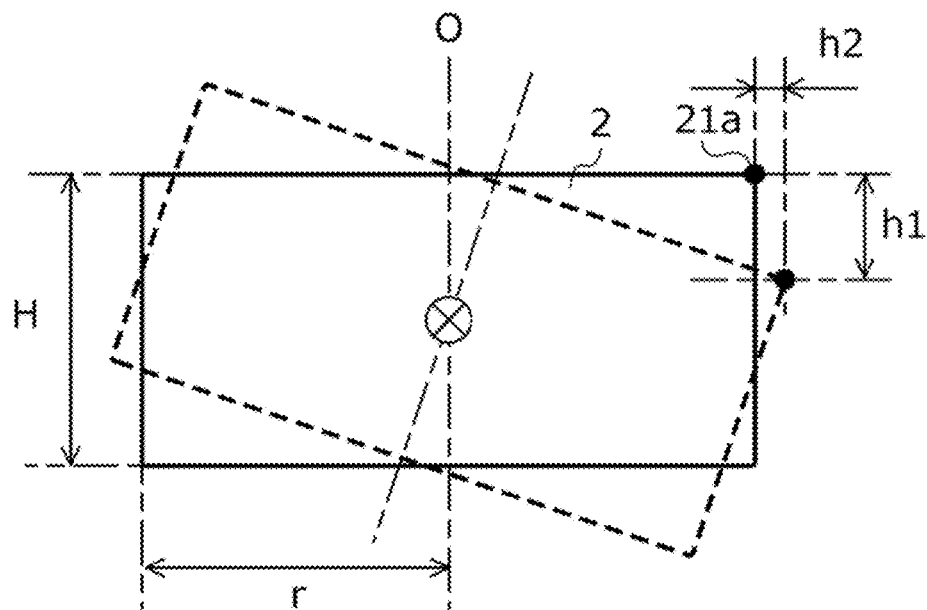
FIG. 6 is a view for explaining a relationship between magnitude of displacement along a vertical direction and horizontal direction of an edge part when the powder fluidizing bed tilts by vibration, and the magnitude of height and radius of the powder fluidizing bed.

FIG. 6 is a view for explaining a relationship between the magnitude of displacement along the vertical direction and horizontal direction of the edge part 21*a* when the powder fluidizing bed 2 tilts by vibration, and the magnitudes of height H and radius r of the powder fluidizing bed 2. As shown in FIG. 6, when the powder fluidizing bed 2 tilts by the vibrations generated by the vibration mechanism 5, the edge part 21*a* displaces by "h1" along the vertical direction, and displaces by "h2" along the horizontal direction (radial direction). In addition, the ratio of these displacements h1 to h2 will change according to the ratio of height H to radius r of the powder fluidizing bed 2.

Figure 7:
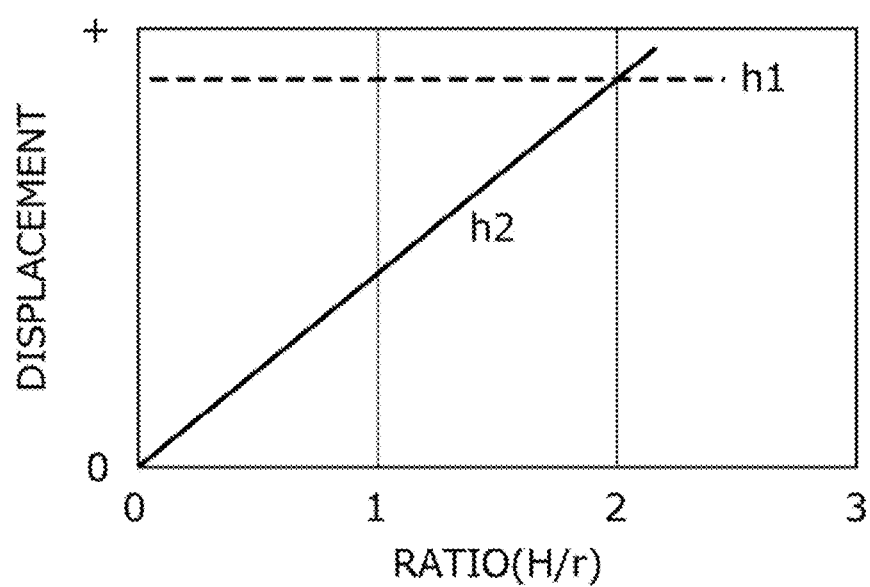
FIG. 7 is a graph showing a relationship between a ratio of height and radius of the powder fluidizing bed and the displacement along the horizontal direction.

FIG. 7 is a graph showing a relationship between a ratio (H/r) of height H and radius r of the powder fluidizing bed 2 and the displacement h2 along the horizontal direction. It should be noted that the angle of tilting the powder fluidizing bed 2 varies according to the ratio H/r of the height and radius so that the displacement h1 along the vertical direction becomes constant in FIG. 7. As shown in FIG. 7, the displacement h2 along the horizontal direction becomes larger as the ratio H/r of the height and radius becomes larger. In addition, when the ratio H/r becomes larger than 2, i.e. when the height H becomes larger than the diameter 2r, the displacement h2 along the horizontal direction will be larger than the displacement h1 along the vertical direction.

In addition, in order to flatten the powder surface within the powder fluidizing bed 2, it is effective to make the displacement along the vertical direction of the powder fluidizing bed 2 larger than the displacement along the horizontal direction. Therefore, in the present embodiment, the height H of the powder fluidizing bed 2 shall be no more than the diameter 2r thereof, so as to be able to make the displacement along the vertical direction of the powder fluidizing bed 2 larger than the displacement along the horizontal direction.

Referring back to FIG. 1, a level meter 7 is provided at the upper side of the powder fluidizing bed 2. The level meter 7 detects the height of the powder surface of powder resin stored within the powder fluidizing bed 2 (more specifically, the distance from a predetermined reference (e.g., edge part 21*a*) along the axis line O), and sends a signal according to the detected value to the control device 8. More specifically, the level meter 7 transmits laser light from a light source towards a predetermined measurement position within the powder fluidizing bed 2, and measures the height of the powder surface at the measurement position based on the position at which the laser light reflected by the powder surface images on a photodetector.

The control device 8 is a computer, which determines the optimum air supply amount to the first air chamber 26 from the air supply device and the optimum frequency of the vibration motor 53 such than flattens the powder surface within the powder fluidizing bed 2 in accordance with a program determined in advance, and drives the air supply device and vibration motor 53 so that these targets are realized. Herein, flattening the powder surface within the powder fluidizing bed 2 more specifically refers to stabilizing the powder surface so that the powder surface height of powder resin stored within the powder fluidizing bed 2 becomes substantially constant irrespective of the measurement position within the powder fluidizing bed 2 and measurement time.

Herein, the specific sequence in the control device 8 for determining the optimum frequency of the vibration motor 53 such that flattens the powder surface within the powder fluidizing bed 2 will be explained. FIG. 1 illustrates only functional blocks 81 to 84 related to the determination of the optimum frequency, among the functions realized by the control device 8.

Figure 8:
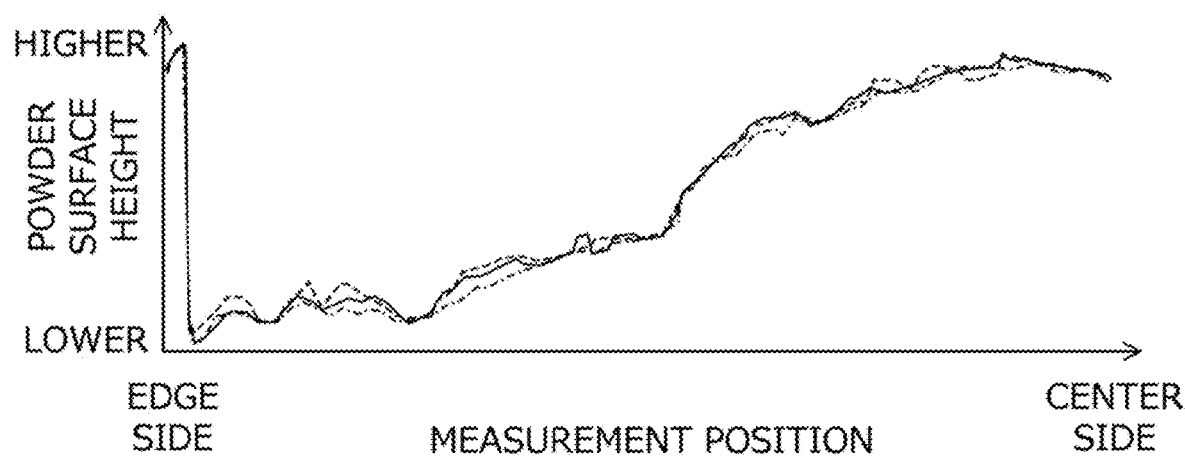
FIG. 8 is a graph for explaining a correlation existing between average particle size of resin powder in the powder fluidizing bed, frequency of the vibration mechanism, and variation in powder surface height.
Figure 9:
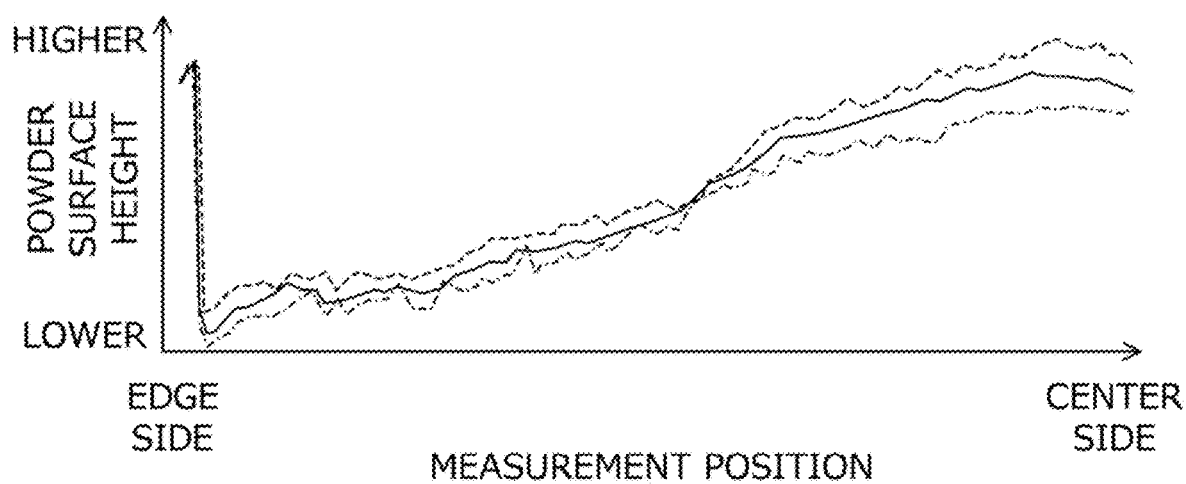
FIG. 9 is a graph for explaining a correlation existing between average particle size of resin powder in the powder fluidizing bed, frequency of the vibration mechanism, and variation in powder surface height.

FIGS. 8 and 9 are graphs for explaining a correlation existing between the average particle size of resin powder within the powder fluidizing bed 2, frequency of the vibration mechanism 5, and variation in powder surface height. More specifically, FIG. 8 is a graph showing a distribution of powder surface height for every measurement position in the case of vibrating the powder fluidizing bed 2 in which powder resin of a predetermined first average particle size is stored, under a predetermined first frequency. FIG. 9 is a graph showing the distribution of powder surface height for every measurement position in the case of vibrating the powder fluidizing bed 2 in which powder resin of the same first average particle size as the example of FIG. 8 is stored, under a second frequency which differs from the above-mentioned first frequency. It should be noted that the powder surface height of powder resin within the powder fluidizing bed 2 has a characteristic of declining concentrically so as to be the highest at the center of the powder fluidizing bed 2 and lowest at the edge part. Therefore, FIGS. 8 and 9 illustrate measuring the powder surface height of the powder fluidizing bed 2 on a measurement line extending along the radial direction at respectively different angles from the center, and change the line type for every angle.

As is clear by comparing this FIG. 8 and FIG. 9, the variation in powder surface height is greater, and surface irregularity in the powder surface is greater for FIG. 9. In other words, relative to the powder fluidizing bed 2 in which powder resin of the first average particle size is stored, it is considered that vibrating under the first frequency can flatten the powder surface more than the second frequency. In other words, in the examples of FIGS. 8 and 9, the first frequency is considered to be the optimum frequency for flattening the powder surface. In addition, although omitted from detailed illustration, in the case of the average particle size of powder resin stored in the powder fluidizing bed 2 differing from the above-mentioned first average particle size, vibrating under a frequency differing from the above-mentioned first frequency is considered better able to flatten the powder surface.

In other words, this means that a correlation exists between the average particle size of powder resin in the powder fluidizing bed 2, the frequency of the vibration mechanism 5 and the variation in powder surface height, and the optimum frequency for flattening the powder surface differs for every average particle size of powder resin.

Referring back to FIG. 1, the aforementioned such correlations between the average particle size of powder resin in the powder fluidizing bed 2, frequency of the vibration mechanism 5, and magnitude of variation in powder surface height are stored in a storage medium 81 of the control device 8. More specifically, a powder surface height—average particle size table defining the relationship between the magnitude of variation in powder surface height (more specifically, standard deviation, for example), and the average particle size of powder resin realizing the magnitude of variation in this powder surface height in the case of vibrating under a predetermined frequency (for example, refer to FIG. 10); and an average particle size—optimum frequency table defining the relationship between the average particle size of powder resin and the optimum frequency minimizing the magnitude of variation in powder surface height of the powder resin of this average particle size (for example, refer to FIG. 11) are stored in the storage medium 81. This powder surface height—average particle size table and average particle size—optimum frequency table are created by performing experiments in advance, and measuring the above-mentioned correlation.

In addition, the average particle size estimation unit 82, after causing the vibration mechanism 5 to vibrate experimentally under a predetermined initial frequency, measures the powder surface height within the powder fluidizing bed 2 by the level meter 7 along the aforementioned plurality of measurement lines, and calculates the magnitude of variation in the powder surface height. In addition, the average particle size estimation unit 82 estimates the average particle size of powder resin currently stored in the powder fluidizing bed 2, by inputting the magnitude of variation in powder surface height calculated using the level meter 7 and the initial frequency realizing this powder surface height into the above-mentioned powder surface height—average particle size table stored in the storage medium 81.

An optimum frequency determination unit 83 determines the optimum frequency to cause the powder surface of powder resin currently stored in the powder fluidizing bed 2 to flatten, by inputting the estimated average particle size obtained by the average particle size estimation unit 82 to the above-mentioned average particle size—optimum frequency table stored in the storage medium 81. The frequency control unit 84 causes the vibration mechanism 5 to vibrate at the optimum frequency determined by the optimum vibration determination unit 83.

Next, a specific sequence of a powder resin coating method to which the powder surface flattening method according to the present embodiment was applied will be explained.

Figure 12:
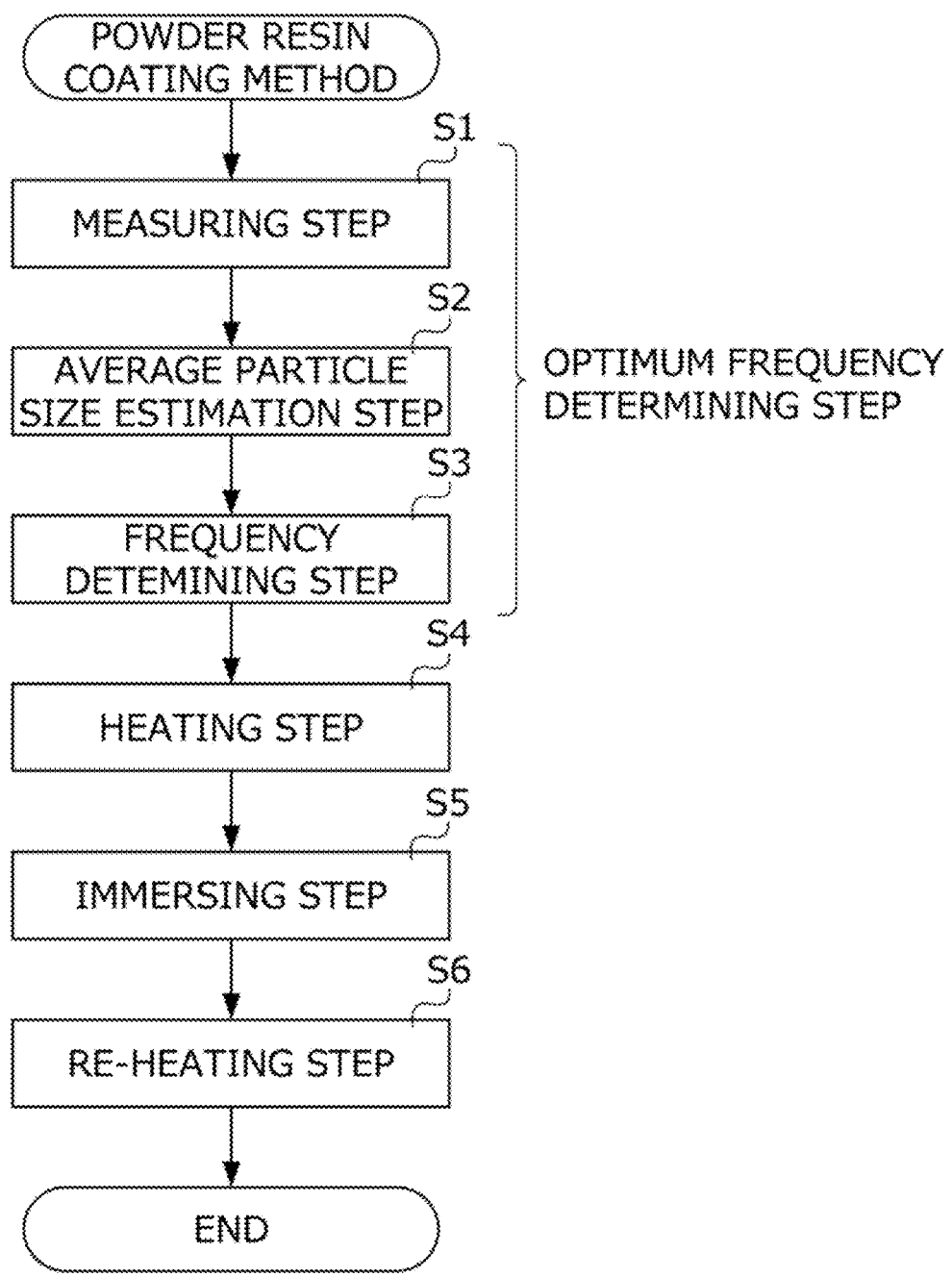
FIG. 12 is a flowchart showing a sequence of a powder resin coating method.
Figure 13:
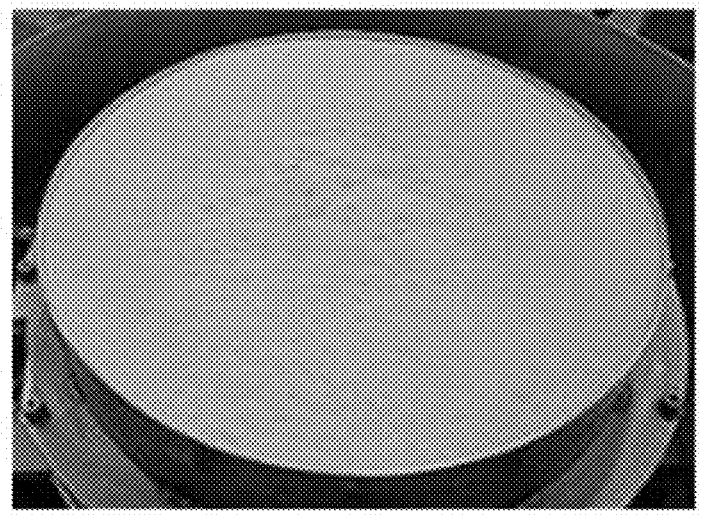
FIG. 13 is a picture showing a state immediately after starting use of the powder surface within the bed when the average particle size is relatively small.
Figure 14:
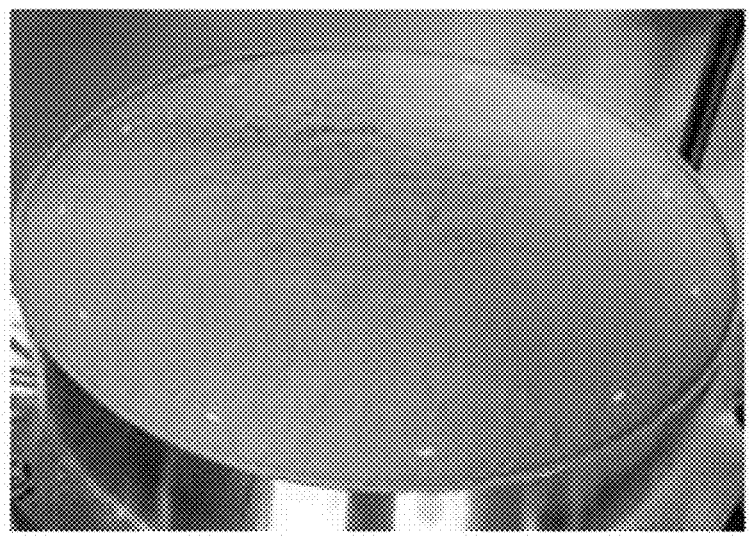
FIG. 14 is a picture showing a state after several tens of days have elapsed since starting use, of the powder surface within the bed when the average particle size is relative large.

FIG. 12 is a flowchart showing the sequence of the powder resin coating method. As shown in FIG. 12, the powder resin coating method includes an optimum frequency determination step (S1 to S3), heating step (S4), immersing step (S5), and re-heating step (S6).

First, the measurement step (S1), after vibrating the vibration mechanism 6 at a predetermined initial frequency, measures the powder surface height within the powder fluidizing bed 2 along a measurement line decided in advance by the level meter 7, and calculates the magnitude of variation in powder surface height.

Next, the average particle size estimation step (S2) estimates the average particle size of the powder resin currently stored in the powder fluidizing bed 2, by inputting the magnitude of the variation in powder surface height calculated in S1 and the initial frequency realizing this powder surface height into the aforementioned powder surface height—average particle size table.

Next, the frequency determination step (S3) determines the optimum frequency which causes the powder surface of powder resin currently stored in the powder fluidizing bed 2 to flatten, by inputted the estimated average particle size obtained in S2 into the average particle size—optimum frequency table.

Next, the heating step (S4) heats the workpiece W up to a predetermined temperature.

Next, the immersion step (S5) immerses the coating site W3 of the heated workpiece W in the powder resin stored within the powder fluidizing bed 2, while forming convective flow of powder resin such as that shown in FIG. 4C, within the powder fluidizing bed 2, by using the vibration mechanism 5 and air supply device, thereby causing the powder resin to deposit on the coating site W3. Particularly upon immersing the coating site W3 in the powder resin stored within the powder fluidizing bed 2 in this immersion step, the vibration mechanism 5 is made to vibrate at the optimum frequency determined in the frequency determination step, while supplying a predetermined amount of air using the air supply device.

In addition, the re-heating step (S6) lifts up the workpiece W from the powder fluidizing bed 2, and further heats this workpiece W again, thereby forming a coating film of resin on the coating site W3.

According to the present embodiment, the following effects are exerted.

(1) The method of flattening a powder surface measures the powder surface height after vibrating the vibration mechanism 5 at the predetermined initial frequency (measurement step); estimates the average particle size of the powder resin based on the correlation between the average particle size, frequency and variation in powder surface height, and combination of initial frequency which is already known and the measured powder surface height (average particle size estimation step); determines the optimum frequency for causing the powder surface to flatten based on this estimated average particle size (frequency estimation step); and further causes the vibration mechanism 5 to vibrate at this determined frequency (immersion step).

According to this method of flattening a powder surface, since it is possible to cause the vibration mechanism 5 to vibrate at the appropriate frequency according to the variation in average particle size of powder resin within the powder fluidizing bed 2, it is possible to maintain the powder surface flat over a long period, and possible to maintain the quality of the finished product to be high. In addition, according to the method of flattening a powder surface, since it is possible to also reduce the frequency of occurrence of completely replacing the powder resin within the powder fluidizing bed 2, the cost can be decreased by this amount.

Although one embodiment of the present invention has been explained above, the present invention is not to be limited thereto. The configurations of detailed parts may be changed as appropriate within the scope of the gist of the present invention.

For example, the above-mentioned embodiment estimates the average particle size using a table constructed based on the correlation between average particle size, frequency and powder surface height, and determines the optimum frequency; however, the present invention is not limited thereto. In the estimation of the average particle size and determination of optimum frequency, a map or formula constructed based on the correlation between average particle size, frequency and powder surface height may be used, or a neural network learned using this correlation may be used.

What is claimed is:

1. A method of flattening a powder surface in a powder resin coating device which includes a bed that stores powder resin and a vibration mechanism that is connected to the bed, by causing the powder surface in the bed to flatten by controlling a frequency of the vibration mechanism, the method comprising the steps of:
    determining a frequency for causing the powder surface to flatten based on an average particle size of powder resin; and
    flattening the powder surface in the bed by causing the vibration mechanism to vibrate at the frequency determined in the step of determining.

2. A method of flattening a powder surface in a powder resin coating device which includes a bed that stores powder resin and a vibration mechanism that is connected to the bed, by causing the powder surface in the bed to flatten by controlling a frequency of the vibration mechanism, the method comprising the steps of:
    measuring a powder surface height within the bed after vibrating the vibration mechanism at a predetermined initial frequency;
    determining a frequency for causing the powder surface to flatten based on the powder surface height measured in the step of measuring; and
    flattening the powder surface in the bed by causing the vibration mechanism to vibrate at the frequency determined in the step of determining.

* * * * *